US012493697B2

(12) United States Patent
Orevi et al.

(10) Patent No.: US 12,493,697 B2
(45) Date of Patent: Dec. 9, 2025

(54) SYSTEM AND METHOD FOR PROTECTING AGAINST WIPERS BY DELAYING SUSPICIOUS ACTIONS

(71) Applicant: CHECK POINT SOFTWARE TECHNOLOGIES LTD., Tel Aviv (IL)

(72) Inventors: Liran Orevi, Rishon-LeZion (IL); Haggai David, Petah-Tikva (IL); Ilan Moshkovich, Tel Aviv (IL); Mikita Karniushka, Minsk (BY); Pavel Kavalenka, Minsk (BY)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 174 days.

(21) Appl. No.: 18/604,942

(22) Filed: Mar. 14, 2024

(65) Prior Publication Data

US 2025/0291917 A1 Sep. 18, 2025

(51) Int. Cl.
*G06F 21/56* (2013.01)
*G06F 21/55* (2013.01)
*G06F 21/57* (2013.01)

(52) U.S. Cl.
CPC .......... *G06F 21/566* (2013.01); *G06F 21/554* (2013.01); *G06F 21/577* (2013.01); *G06F 21/55* (2013.01); *G06F 21/565* (2013.01); *G06F 21/568* (2013.01); *G06F 2201/865* (2013.01)

(58) Field of Classification Search
CPC .... G06F 21/566; G06F 21/554; G06F 21/577; G06F 21/55; G06F 21/565; G06F 21/568; G06F 2201/865
See application file for complete search history.

(56) References Cited

U.S. PATENT DOCUMENTS

| | | | | |
|---|---|---|---|---|
| 9,317,686 | B1 * | 4/2016 | Ye | G06F 21/568 |
| 9,479,357 | B1 * | 10/2016 | Fu | H04W 12/128 |
| 10,193,918 | B1 * | 1/2019 | Patton | G06F 21/566 |
| 10,503,904 | B1 * | 12/2019 | Singh | G06F 21/566 |

(Continued)

FOREIGN PATENT DOCUMENTS

KR 20100089245 A * 8/2010 ............. G06F 21/53

OTHER PUBLICATIONS

Arabo, Abdullahi, et al. "Detecting ransomware using process behavior analysis." Procedia Computer Science 168 (2020): 289-296. (Year: 2020).*

*Primary Examiner* — Robert B Leung
(74) *Attorney, Agent, or Firm* — Renner, Otto, Boisselle & Sklar, LLP

(57) ABSTRACT

A device and method are provided for protecting against malware attacks affecting a computer system. To do so, system operations are detected and categorized as benign, suspicious, or malicious. Suspicious actions are delayed and placed in a queue instead of being immediately executed. The process initiating the suspicious action is determined and the suspicious action is categorized as benign or malicious based on the initiating process. When the suspicious action is categorized as a benign action, the suspicious action is performed. Conversely, when the suspicious action is categorized as a malicious action, the suspicious process is terminated, and the malicious action is removed from the unperformed actions queue without performing the malicious action.

20 Claims, 3 Drawing Sheets

(56) References Cited

U.S. PATENT DOCUMENTS

| | | | |
|---|---|---|---|
| 2016/0180087 A1* | 6/2016 | Edwards | H04L 63/145 |
| | | | 726/24 |
| 2018/0075234 A1* | 3/2018 | Boutnaru | G06F 21/554 |
| 2019/0042781 A1* | 2/2019 | Lukacs | G06F 21/56 |
| 2022/0092181 A1* | 3/2022 | Ellam | G06F 21/568 |
| 2022/0292195 A1* | 9/2022 | Holland | G06F 21/554 |

* cited by examiner

SYSTEM AND METHOD FOR PROTECTING AGAINST WIPERS BY DELAYING SUSPICIOUS ACTIONS

TECHNICAL FIELD

The present disclosure relates generally to computer security and more particularly to protecting computer systems from malicious attacks.

BACKGROUND

Ransomware is malware designed to deny a user or organization access to files on their computer. By encrypting these files and demanding a ransom payment for the decryption key, the malware places organizations in a position where paying the ransom is the easiest and cheapest way to regain access to their files.

Wipers are a type of ransomware that harms a computer by deleting files. Traditional ransomware protection methods, such as antivirus software and backups, may not be effective against wipers.

To be successful, wipers need to gain access to a target system and delete files. Wipers, like any malware, can gain access to an organization's systems in a number of different ways including phishing emails, using stolen or guessed login credentials, or using unpatched security vulnerabilities.

SUMMARY

The present disclosure provides a device and method for malware protection that delays potentially harmful actions (suspicious actions) by delaying the suspicious action or performing an alternative safer action. Rather than blocking actions initiated after the suspicious action, these later initiated actions may be used to help classify the suspicious action as benign or malicious.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the many ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
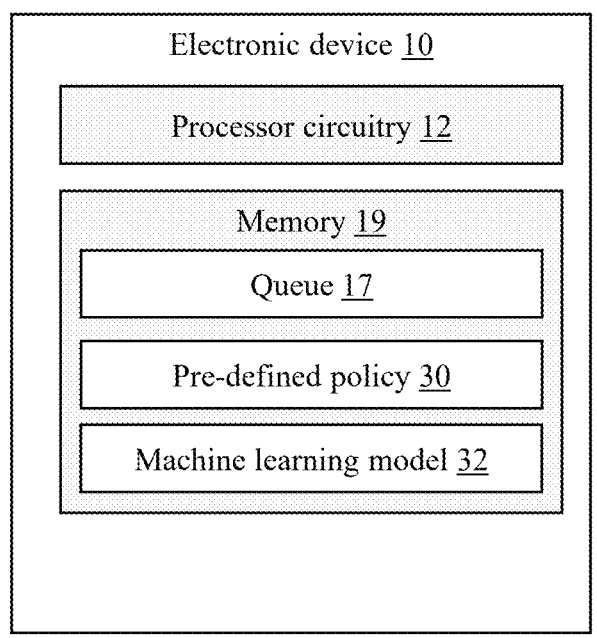
FIG. 1 is a block diagram of an embodiment of an electronic device for protecting against malware attacks affecting a computer system.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a device and method for protecting against malware attacks affecting a computer system. To do so, system operations are detected and categorized as benign, malicious, or suspicious. Benign actions are performed, and malicious actions are not performed. Suspicious actions are delayed and placed in a queue instead of being immediately executed. The process initiating the suspicious action is determined and the suspicious action is categorized as benign or malicious based on the initiating process. When the suspicious action is categorized as a benign action, the action is performed. Conversely, when the suspicious action is categorized as a malicious action, the suspicious process is terminated, and the malicious action is removed from the unperformed actions queue without performing the malicious action.

According to a general embodiment shown in FIG. 1, an electronic device 10 is provided for protecting against malware attacks affecting a computer system. The electronic device 10 delays performing suspicious actions until the suspicious action is identified as benign or malicious. Rather than blocking actions initiated after the suspicious action, the electronic device 10 may use these later initiated actions to help classify the suspicious action as benign or malicious.

The electronic device 10 includes processor circuitry 12 for monitoring the computer system by detecting a system operations 14. The processor circuitry 12 categorizes the detected system operations 14 as benign actions, malicious actions, or suspicious actions by identifying each of the system operations 14 as a benign action 15, a suspicious action 16 (potentially employed by a malware attack), or a malicious action 20. System operations 14 may be any system operation such as file system operations, network operations, system setting operations, privilege escalation, etc.

In one embodiment, the system operation 14 may be categorized as a suspicious action 16 when the operation attempts to remove a resource or alter user permissions. For example, the system operation 14 may be categorized as a suspicious action 16 when it affects at least one of stored electronic files, user permissions, or a disk layout. In this example, stored electronic files may refer to a database storing data. As an example, the system operation 14 may be categorized as a suspicious action when it includes deletion or encryption of at least one: file, directory, user, user group, resource group, registry entry, or credential. All other system operations 14 not categorized as suspicious may be categorized as a benign action 15.

For example, a system operation 14 may be automatically categorized as a malicious action 20 when the system operation 14 modifies (e.g., changes or tampers) a canary resource. A canary resource is a resource (such as a file, a directory, a user object, user group, resource group, registry entry or credential) that was set up to detect malicious actions 20 and typically has no other use in the system other than detection of malicious actions 20.

Categorization of the system operation 14 as suspicious, malicious, or benign may be performed using any suitable method. For example, the processor circuitry 12 may categorize the system operation 14 as a malicious action 20, a suspicious action 16, or a benign action 15 by comparing the process initiating the system operation 14 (i.e., a suspicious process 18) to a pre-defined policy 30. The predefined policy 30 may specify parameters for known malware including at least one of a binary signature of the suspicious process, name of the suspicious process, a source of the suspicious process, other running processes, other loaded processes, name of a file affected by the system operation 14, signor of the suspicious process' binaries, time of day that the system operation 14 was initiated, whether the suspicious process has a user interface, whether the suspicious process has a graphical user interface, or whether the suspicious process is user interactive. For example, the policy 30 may classify as malicious any system operation attempting to delete system files (e.g., C:\Windows).

By comparing the suspicious process 18 and the system operation 14 to the policy 30, the processor circuitry 12 may determine whether the suspicious process 18 and the system operation 14 match a signature of any known malware. A score may be determined based on this comparison and this score may be used to categorize the system operation 14 as a malicious action 20, a benign action 15, or a suspicious action 16.

The processor circuitry 12 may alternatively or additionally use a machine learning model to categorize the system operations 14. For example, the machine learning model 32 may be pre-trained (i.e., the machine learning model 32 may be trained previously or by another computer device) and fine-tuned (i.e., the pre-trained model may be adapted, e.g., based on an initial learning period) using detected system operations during an initial learning period (e.g., first 24 hours). In one embodiment, the machine learning model 32 is based on recurrent neural network (RNN) architecture. In this embodiment, the previously detected system operations may be input to the machine learning model 32 and used to categorize the system operation 14 as malicious, suspicious, or benign.

Figure 2:
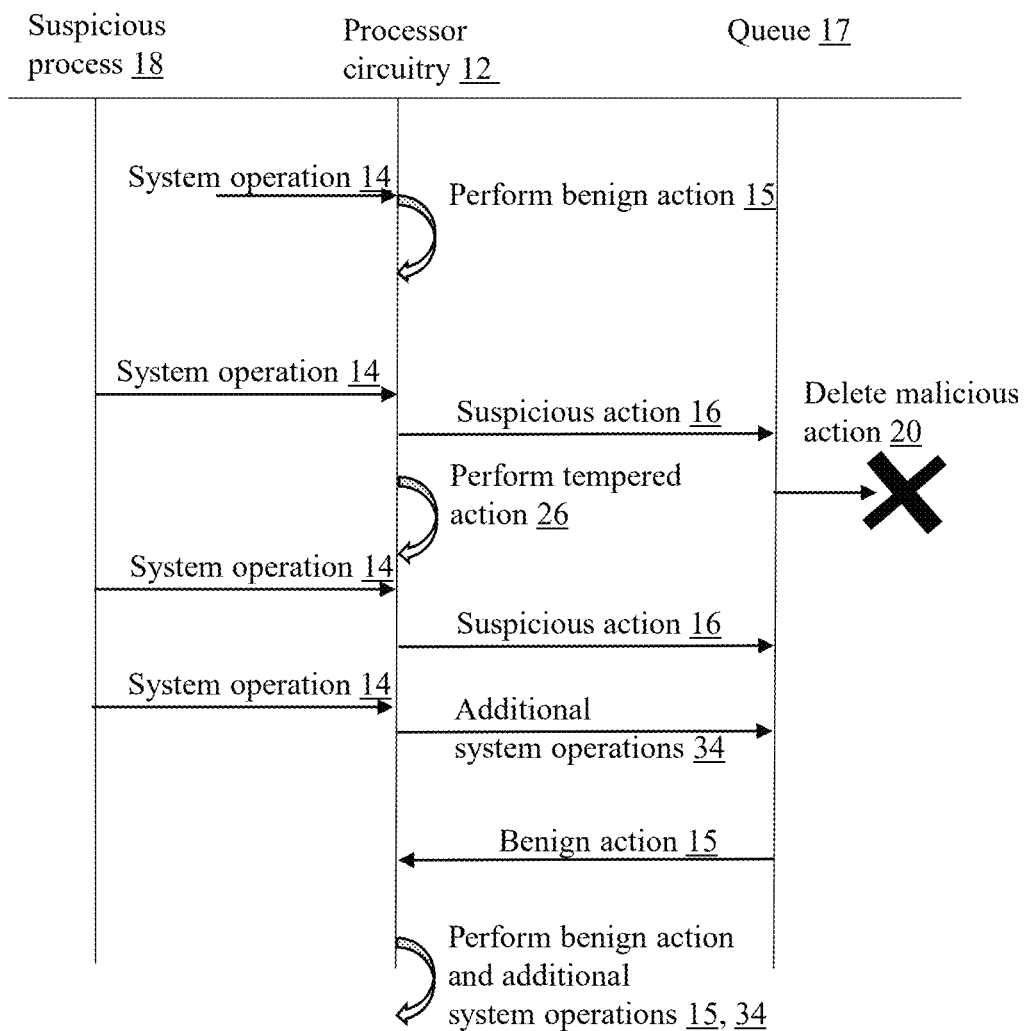
FIG. 2 is a ladder diagram depicting an exemplary operation of the electronic device.

With exemplary reference to FIG. 2, for each of the identified suspicious actions 16, the processor circuitry 12 delays performance of the suspicious action 16 by adding the suspicious action to a queue of unperformed actions 17. The queue 17 may be stored in a memory 19 of the electronic device 10. The processor circuitry 12 determines a suspicious process 18 initiating the suspicious action 16. The processor circuitry 12 continues to allow the suspicious process 18 to initiate system operations 14 that are detected and categorized by the processor circuitry 12. The processor circuitry 12 identifies the suspicious action 16 as a malicious action or a benign action based on the determined suspicious process 18.

For each of the system operations 14 identified as a benign action 15, the processor circuitry 12 performs the system operation 14. That is, for system operations 14 that were directly identified as a benign action 15 or that were first identified as a suspicious action 16 before being identified as a benign action 15, the processor circuitry 12 performs the system operation 14. Conversely, for each of the system operations 14 identified as a malicious action 20 (i.e., system operations 14 that were directly identified as a malicious action 20 or that were first identified as a suspicious action 16 before being identified as a malicious action 20), the processor circuitry 12 does not perform the malicious action 20. Instead, the processor circuitry 12 determines a process that initiated the malicious action 20 and terminates the determined process. Additionally, when the malicious action 20 is stored in the unperformed actions queue 17, the processor circuitry 12 removes the malicious action 20 from the unperformed actions queue without performing the malicious action 20.

The processor circuitry 12 may delay performance of the suspicious action 16 by determining and performing a tempered action 26 as a substitution for the suspicious action 16. For example, when the suspicious action 16 is a delete operation affecting a file, the tempered action 26 may be a move operation moving the file from an original location to a backup location (e.g., moving a file pointer instead of copying the entire file). In this way, it may appear to the process initiating the delete action that the delete operation was performed. However, by only moving the file, the delete action may be undone (i.e., rolled back) if the delete action was found to be a malicious action. As another example, when the suspicious action 16 is a user privilege escalation (e.g., requesting administrator rights to a directory, the tempered action 26 may be to grant less privileges (e.g., read access to the directory instead of full administrator rights). In this way, the user may still access the directory without having privileges to delete or take other potentially harmful actions.

The decision to delay a suspicious action 16 or to perform a tempered action 26, and which tempered action 26 to choose may be made using any suitable method. For example, the decision may be made using a lookup table identifying different suspicious actions 16. Each suspicious action 16 in the lookup table may be associated with a delay (e.g., including an amount of time to delay) and/or a tempered action 26 to use as a replacement for the suspicious action 16. As another example, an algorithm (e.g., a machine learning model) may be used to make the decision. For example, the algorithm may receive as an input the suspicious action 16, a history of performed system operations, and the received additional system operations 34. The algorithm may then output a time delay and/or a tempered action 26.

As described above, once an action is categorized as suspicious, the processor circuitry 12 determines the process (referred to as a suspicious process) 18 that initiated the suspicious action 16. The processor circuitry 12 then categorizes the suspicious action 16 as a malicious action 20 or a benign action 15 based on the determined suspicious process 18.

In one embodiment, the processor circuitry 12 categorizes the suspicious action 16 as a malicious action 20 when the delayed operation timer expires and/or when a ransomware attack is detected. That is, when delaying the suspicious action 16, the processor circuitry 12 may delay performing the suspicious action 16 by a fixed time duration. When this fixed time duration expires, the suspicious action 16 may be categorized as a malicious action 20 if a decision has not already been made to categorize the suspicious action 16 as benign. In this way, the default decision may be to categorize a suspicious action 16 as a malicious action 20.

When the suspicious action 16 is categorized as a malicious action 20, the processor circuitry 12 may roll back the tempered action. For example, continuing the above example where the suspicious action 16 is a delete operation and the tempered action 26 is a move operation, rolling back of the tempered action 26 may return the file to the original location of the file.

During the delay before performing the suspicious action 16, the processor circuitry 16 may detect additional system operations 34 initiated by the suspicious process 18. These detected additional system operations 34 are categorized as benign, malicious, or suspicious and handled accordingly. If the detected additional system operations 34 are categorized as suspicious actions, the processor circuitry 12 may delay performance of the additional system operations 34 and add the additional system operations 34 to the unperformed actions queue 17. These additional system operations 34 (i.e., the system operations initiated by the suspicious process during the delay) may be used by the processor circuitry 12 to categorize the suspicious action 16 as a malicious action 20 or a benign action 15.

As an example, traditional antivirus programs may pause requested actions until a decision is made concerning whether the requested action is malicious. During this delay, the antivirus blocks the request for additional actions. Rather than blocking a process from requesting additional actions, the processor circuitry 12 may instead permit the suspicious process 18 to request additional system operations 34 and then use these additional system operations 34 in categorizing the suspicious process 18. For example, it may be common for a process to delete a single file, but a process requesting to delete thousands of files may be a sign that the process is malicious. By allowing the suspicious process 18 to request additional system operations 34, the processor circuitry 12 may wait to see if the suspicious process 18 is requesting to delete a small number of files (e.g., a sign that the suspicious process 18 is benign) or a large number of files (e.g., a sign that the suspicious process 18 is malicious).

When the suspicious action 16 is identified as a malicious action 20, the processor circuitry 12 removes from the unperformed actions queue 17 without performing any additional system operations 34 initiated by the suspicious process.

When delaying the suspicious action 16, the processor circuitry 12 may delay performing the suspicious action 16 for any suitable duration. For example, the delay may be in the range of 100-300 milliseconds, up to one second, etc. At the completion of the delay, the processor circuitry 12 may (as described in further detail above) categorize the suspicious action 16 as benign and perform the action, categorize the suspicious action 16 as malicious and not perform the action, or to perform the tempered action instead of the suspicious action 16.

Figure 3:
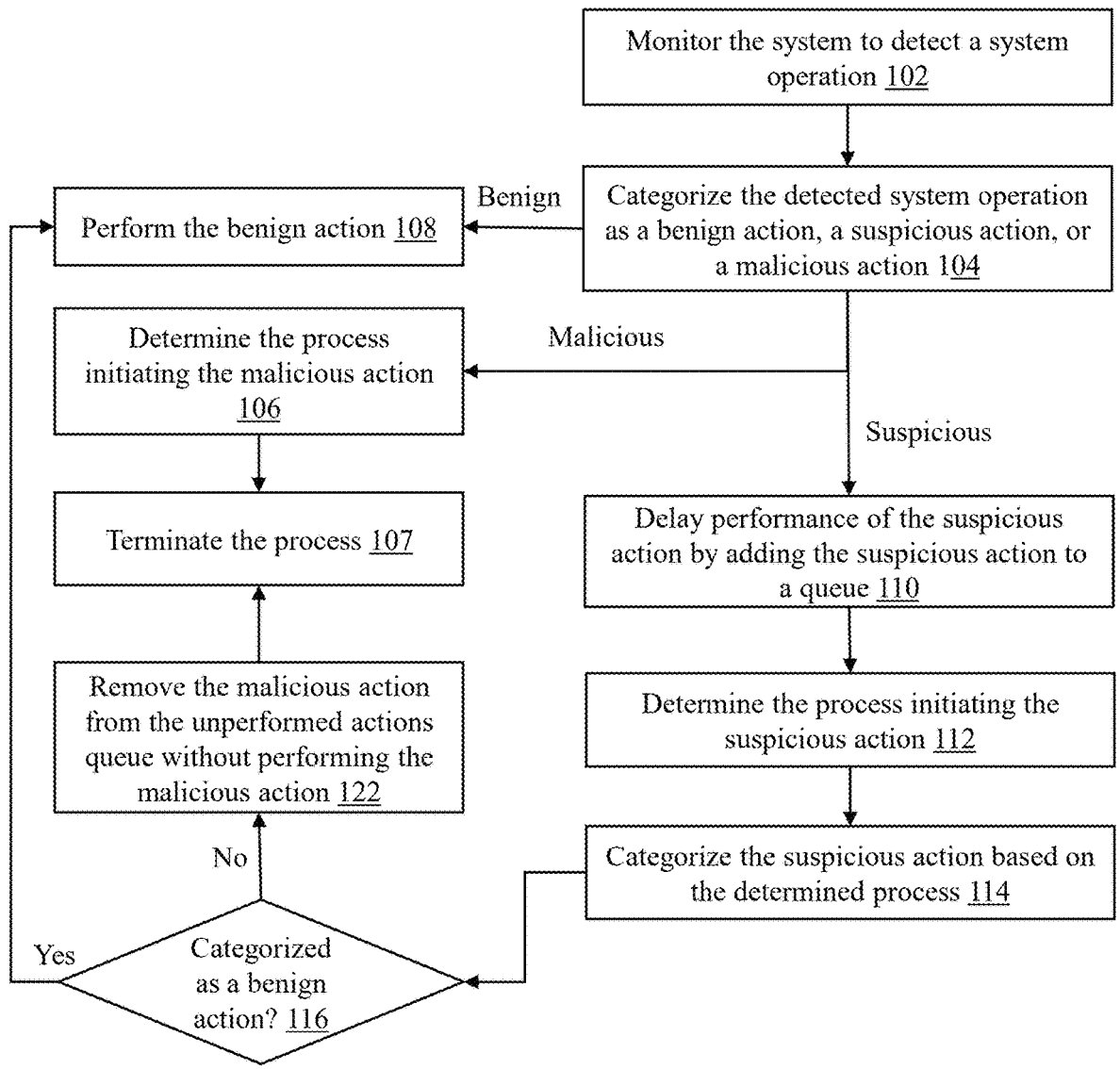
FIG. 3 is a flow diagram of an embodiment of a method for protecting against malware attacks affecting a computer system.

Turning to FIG. 3, an exemplary embodiment of a method 100 implemented by the processor circuitry 12 is shown for protecting against malware attacks affecting a computer system. In step 102, the processor circuitry 12 monitors the file system to detect a system operation. In step 104, the processor circuitry categorizes the detected system operation as benign actions, malicious actions, or suspicious actions by identifying each of the system operations as a benign action, a malicious action, or a suspicious action. In step 106, when the system operation is determined to be malicious, the process initiating the malicious action is determined as a suspicious process. In step 107, the suspicious process is terminated. Conversely, in step 108, when the system operation is categorized as a benign action, the processor circuitry performs the system operation.

Alternatively, when the system operation is categorized as a suspicious action, in step 110 the processor circuitry 12 delays performing the suspicious action by adding the suspicious action to the queue of unperformed actions. In step 112, the processor circuitry 12 determines the process initiating the suspicious action. In step 114, the processor circuitry 12 categorizes the suspicious action as a malicious action or a benign action based on the determined process.

In step 116, a check is made to determine if the suspicious action is categorized as a malicious action or a benign action.

When the suspicious action is categorized as a benign action, processing returns to step 108 and the benign action is performed. Conversely, when the suspicious action is categorized as a malicious action, the processor circuitry removes the malicious action from the unperformed actions queue without performing the malicious action in step 122. Following step 122, processing returns to step 107 and the malicious process is terminated.

The electronic device 10 may be any suitable computer device for monitoring a computer system and may encompass a range of configurations and designs. For example, the electronic device 10 may be implemented as a singular computing device, such as a server, desktop computer, laptop, or other standalone units. These individual devices may incorporate essential components like a central processing unit (CPU), memory modules (including random-access memory (RAM) and read-only memory (ROM)), storage devices (like solid-state drives or hard disk drives), and various input/output (I/O) interfaces. Alternatively, the electronic device 10 may constitute a network of interconnected computer devices, forming a more complex and integrated system. This could include server clusters, distributed computing environments, or cloud-based infrastructures, where multiple devices are linked via network interfaces to work cohesively, often enhancing processing capabilities, data storage, and redundancy.

The processor circuitry 12 may have various implementations. For example, the processor circuitry 12 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 12 may be located on one or more discrete and separate pieces of hardware. The processor circuitry 12 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 12. The processor circuitry 12 may be communicatively coupled to the computer readable medium and communication interface through a system bus, mother board, or using any other suitable structure known in the art.

The electronic device 10 may include memory 19. The memory 19 may be any suitable computer readable medium, such as one or more of a buffer, a flash memory, a hard drive, a removable media, a volatile memory, a non-volatile memory, a random-access memory (RAM), or other suitable device. In a typical arrangement, the memory may include a non-volatile memory for long term data storage and a volatile memory that functions as system memory for the processor 12. The memory may exchange data with the processor circuitry over a data bus. Accompanying control lines and an address bus between the memory and the processor circuitry also may be present. The memory is considered a non-transitory computer readable medium.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described processes including portions thereof can be performed by software, hardware, and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An electronic device for protecting against malware attacks affecting a computer system comprising:
processor circuitry configured to:
monitor the computer system by detecting system operations;
categorize the detected system operations as benign actions, malicious actions, or suspicious actions by identifying each of the system operations as a benign action, a suspicious action, or a malicious action;
for each of the identified suspicious actions:
delay performance of the suspicious action by adding the suspicious action to a queue of unperformed actions;
determine a suspicious process initiating the suspicious action;
continue to allow the suspicious process to initiate system operations that are detected and categorized by the processor circuitry; and
identify the suspicious action as a malicious action or a benign action based on the determined suspicious process;
for each of the identified benign actions, perform the benign action;
for each of the identified malicious actions:
not perform the malicious action;
when the malicious action is stored in the unperformed actions queue, remove the malicious action from the unperformed actions queue without performing the malicious action;
determine a process initiating the malicious action; and
terminate the determined process.

2. The electronic device of claim 1, wherein the delaying of the performance of the suspicious action includes:
determining a tempered action as a substitution for the suspicious action; and
performing the tempered action.

3. The electronic device of claim 2, wherein the processor circuitry is additionally configured to, when the suspicious action is categorized as a malicious action, roll back the tempered action.

4. The electronic device of claim 3, wherein:
the suspicious action is a delete operation affecting a file;
the tempered action is a move operation moving the file from an original location to a backup location; and
the rolling back of the tempered action returns the file to the original location.

5. The electronic device of claim 1, wherein the categorizing of the suspicious action as a malicious action or a benign action is additionally based on the system operations initiated by the suspicious process during the delaying of the performance of the suspicious action.

6. The electronic device of claim 5, wherein the processor circuitry is additionally configured to:
when the suspicious action is identified as a malicious action, remove from the unperformed actions queue without performing any system operations initiated by the suspicious process.

7. The electronic device of claim 1, wherein:
the categorizing of the system operation as a malicious action, a suspicious action, or a benign action includes comparing the system operation to a pre-defined policy; and
the predefined policy specifies parameters for known malware including at least one of a binary signature of the suspicious process, name of the suspicious process, a source of the suspicious process, other running processes, other loaded processes, name of a file affected by the system operation, signor of the suspicious process, time of day that the system operation was initiated, whether the suspicious process has a user interface, whether the suspicious process has a graphical user interface, or whether the suspicious process is user interactive.

8. The electronic device of claim 1, wherein the categorizing of the system operation as a malicious action, a suspicious action, or a benign action includes analyzing the system operation with a machine learning model.

9. The electronic device of claim 1, wherein the detected system operation is categorized as a suspicious action when it affects at least one of stored electronic files, user permissions, or a disk layout.

10. The electronic device of claim 9, wherein the detected system operation is categorized as a suspicious action when the system operation includes deletion of at least one:
file, directory, user, user group, resource group, registry entry, or credential.

11. A method implemented by processor circuitry for protecting against malware attacks affecting a computer system, the method comprising:
monitoring with the processor circuitry the computer system by detecting system operations;
categorizing with the processor circuitry the detected system operations as benign actions, malicious actions, or suspicious actions by identifying each of the system operations as a benign action, a suspicious action, or a malicious action;
for each of the identified suspicious actions:
delay performance of the suspicious action by the processor circuitry adding the suspicious action to a queue of unperformed actions;
determine with the processor circuitry a suspicious process initiating the suspicious action;
continue to allow the suspicious process to initiate system operations that are detected and categorized by the processor circuitry; and
identify with the processor circuitry the suspicious action as a malicious action or a benign action based on the determined suspicious process;
for each of the identified benign actions, the processor circuitry performing the benign action;
for each of the identified malicious actions, the processor circuitry:
not performing the system operation;
determining a process initiating the malicious action; and
terminating the suspicious process.

12. The method of claim 11, wherein the delaying of the performance of the suspicious action includes:
determining with the processor circuitry a tempered action as a substitution for the suspicious action; and
performing with the processor circuitry the tempered action.

13. The method of claim 12, wherein when the suspicious action is categorized as a malicious action, the processor circuitry rolls back the tempered action.

14. The method of claim 13, wherein:
the suspicious action is a delete operation affecting a file;
the tempered action is a move operation moving the file from an original location to a backup location; and
the rolling back of the tempered action returns the file to the original location.

15. The method of claim 11, wherein the categorizing of the suspicious action as a malicious action or a benign action is additionally based on the system operations initiated by the suspicious process during the delaying of the performance of the suspicious action.

16. The method of claim 15, further comprising:
when the suspicious action is identified as a malicious action, the processor circuitry removing from the unperformed actions queue without performing any system operations initiated by the suspicious process.

17. The method of claim 11, wherein:
the categorizing of the system operation as a malicious action, a suspicious action, or a benign action includes comparing the system operation to a pre-defined policy; and
the predefined policy specifies parameters for known malware including at least one of a binary signature of the suspicious process, name of the suspicious process, a source of the suspicious process, other running processes, other loaded processes, name of a file affected by the system operation, signor of the suspicious process, time of day that the system operation was initiated, whether the suspicious process has a user interface, whether the suspicious process has a graphical user interface, or whether the suspicious process is user interactive.

18. The method of claim 11, wherein the categorizing of the system operation as a malicious action, a suspicious action, or a benign action includes analyzing the suspicious process and the system operation with a machine learning model.

19. The method of claim 11, wherein the detected system operation is categorized as a suspicious action when it affects at least one of stored electronic files, user permissions, or a disk layout.

20. The method of claim 19, wherein the detected system operation is categorized as a suspicious action when the system operation includes deletion of at least one: file, directory, user, user group, resource group, registry entry, or credential.

* * * * *